United States Patent [19]

Philipp

[11] Patent Number: 4,736,097
[45] Date of Patent: Apr. 5, 1988

[54] OPTICAL MOTION SENSOR

[76] Inventor: Harald Philipp, 15320 NE. 11th, Apt. K326, Bellevue, Wash. 98007

[21] Appl. No.: 9,777

[22] Filed: Feb. 2, 1987

[51] Int. Cl.$^4$ .............................................. G01V 9/04
[52] U.S. Cl. ................................. 250/221; 250/222.1; 250/214 B; 250/205; 340/556; 358/105
[58] Field of Search ................... 250/221, 222.1, 209, 250/214 AL, 214 B, 214 R, 205; 340/555, 556, 557; 358/105

[56] References Cited

U.S. PATENT DOCUMENTS

| 1,806,199 | 5/1931 | Hardy et al. | 250/222.1 |
| 2,227,147 | 12/1940 | Lindsay . | |
| 3,278,923 | 10/1966 | Archer | 340/555 |
| 3,278,924 | 10/1966 | Archer . | |
| 3,281,817 | 10/1966 | Archer . | |
| 3,428,815 | 2/1969 | Thompson | 250/222.1 |
| 3,597,755 | 8/1971 | Parkin . | |
| 3,644,917 | 2/1972 | Perlman | 340/258 B |
| 3,704,374 | 11/1972 | Kaufman | 250/214 AL |
| 3,858,043 | 12/1974 | Sick et al. | 250/221 |
| 3,859,648 | 1/1975 | Corbin | 340/258 B |
| 4,032,777 | 6/1977 | McCaleb | 250/214 B |
| 4,247,765 | 1/1981 | Bergström | 250/205 |
| 4,292,630 | 9/1981 | Dumont | 250/221 |
| 4,310,756 | 1/1982 | Sick et al. | 250/221 |
| 4,467,251 | 8/1984 | Jonsson | 318/480 |
| 4,581,526 | 4/1986 | Brattgard | 250/221 |

OTHER PUBLICATIONS

Bushong, D. B., "AGC-Controlled Light-Beam Detector Ignores Ambient Light Changes", *Electronic Design*, vol. 29, No. 19, 188, 190 (Sep. 17, 1981).
Pshaenich, A., "Constant-Current Feedback Loop Improves Photodetector Performance in Optical Sensors."

*Primary Examiner*—David C. Nelms
*Assistant Examiner*—Jessica L. Ruoff

[57] ABSTRACT

An optical motion sensor comprises first and second light emitting diodes that emit complementary pulsed beams of infrared energy within a sensing region. A photodiode sums the energies to produce a proportional sensing signal. An amplifier AC coupled to the photodiode blocks the constant portion of the sensing signal and passes a time varying signal portion produced by motion of an object to a sampling circuit. The sampling circuit samples the sensing signal synchronous with emission of the first pulsed beam and converts the time varying signal to a proportional detection signal. An integrator coupled to the sampling circuit responds to a detection signal by modulating the intensity of the second pulsed beam to null the earlier time varying portion of the sensing signal. The motion sensor can be configured as a presence sensor by changing the time constant of the integrator. A slower time constant changes the rate at which the beam intensity is modulated and thus increases the duration of the detection signal.

18 Claims, 3 Drawing Sheets

OPTICAL MOTION SENSOR

TECHNICAL FIELD

This invention generally relates to motion sensing apparatus and more particularly to an optical motion sensor for sensing motion or presence within a sensing region.

BACKGROUND OF THE INVENTION

Motion sensors find widespread use in many industrial, commercial, and consumer markets. For industry and commerce, a primary use is for security by detecting human motion in a factory, office, or home. For commercial establishments, such as department or grocery stores, motion sensors are used to open doors automatically upon sensing the approach of a person or other moving object. Other uses are varied, including the counting of objects on a conveyor belt.

Motion sensors presently available include mechanical switches, magnetic sensors, photoelectric sensors, acoustic sensors, microwave sensors, and active and passive infrared sensors. Each of these technologies has strength and weaknesses. Mechanical switches that are commonly found in doormats of grocery store doors are subject to wear from heavy and continual traffic thereon. Moreover, the doormats are often in an entry location and exposed to extreme weather such as heat, rain, and snow which affects their reliability and lifetime. A further drawback of mechanical switches is that they require physical contact with the object to be sensed.

The other types of sensors mentioned above do not require physical contact with the moving object but have their own drawbacks. Magnetic sensors, for example, have a very short range and can detect only ferrous or magnetic materials. Acoustic sensors cannot be narrowly focused on a selected region of space and furthermore are relatively expensive, quite large, and unable to adjust adequately to changes in background noise. Microwave sensors suffer from cross interference with adjacent microwave sensors and from wide beam dispersion. Photoelectric sensors, on the other hand, have too narrow a beam dispersion and require that the moving object break the beam. Although this may be an adequate technique for opening doors, it can be easily circumvented by one engaged in unauthorized entry.

Recently much interest has been shown in infrared motion sensors. Such sensors take two forms: active sensors that include one or more emitting elements and one or more receiving elements and passive sensors that comprise only receiving elements that sense a change in ambient infrared energy. Passive infrared sensors are expensive and are easily fooled by changes in ambient conditions. Furthermore, since they detect such energy from the body heat of a person, they may not detect persons wearing heavy clothing that trap body heat.

A drawback of active sensors is their reliance on a plurality of spaced apart detectors and emitters. The additional emitters are necessary to provide sufficient intensity for the detector to discriminate against ambient light. The higher intensity, however, limits the sensitivity of the detector and thus the dynamic range of the sensor. A more serious drawback is the lack of automatic adjustment in response to changes in ambient conditions. For example, if a surface within the sensing region, such as a sidewalk, changes its reflective characteristics because of snowfall or rain, the amount of reflected infrared energy will change, causing the detector to falsely indicate the presence of an object. The same problem occurs if an object such as a product display in a store is moved into the sensing region. The active sensor must be manually adjusted to compensate for the presence of the new object. Otherwise, the sensors are overly sensitive to changes in energy and can easily saturate unless the energy received is decreased. This adjustment of sensitivity, however, limits the range in which the sensor is effective.

SUMMARY OF THE INVENTION

An object of the invention therefore is to provide an improved optical motion sensor.

A further object of the invention is to provide such a sensor that can automatically adjust to sense movement near and far across a wide sensing region.

Yet another object of the invention is to provide such a system that ignores changes in ambient light while sensing motion.

Still another object of the invention is to provide such a system that can selectively sense motion or presence of an object within a sensing region of space.

A further object of the invention is to provide such a sensor that requires minimal energy, is of minimal size, and can be produced for a low cost.

To achieve these objects, an optical motion sensor according to the invention includes means for emitting a first beam of energy and means for emitting a second beam of energy complementary to the first pulsed beam. A sensing means receives and sums the energies of the first and second beams to produce a sensing signal. The sensing signal has a constant or DC portion and may have a time varying or AC portion. Filter means are coupled to the sensing means to block the constant signal portion and pass the time varying signal portion. Detection means are provided for converting the time varying signal to a proportional detection signal indicative of motion. This time varying signal can occur, for example, if an object enters the sensing region of space monitored by the sensor and changes the amount of energy reflected toward the sensing means. To adjust to a change in energy received at the summing means, modulating means responsive to the detection signal modulates after delay one of the beams to compensate and null the earlier time varying signal. However, the detection signal continues until the motion stops within the sensing region and the modulating means succeeds in producing a constant sensing signal. The sensor has then been adjusted to the presence of a static object within the sensing region. This modulating means can also be useful to adjust to changes in the ambient light that disproportionately affects the two beams.

In the embodiment described, the first and second emitting means comprises infrared light emitting devices pulsed to complement each other and the sensing means comprises a photodetector. However, devices that emit other energy forms such as electrostatic, magnetic, or acoustic could conceivably be used.

The general method of the invention includes generating a first beam of energy to reflect off objects within a selected region of space before being sensed and generating a second beam complementary to the first pulsed beam, the second pulsed beam being sensed directly. The sum of the beam energies is sensed and a detection signal generated indicative of motion if the energy sum varies as the beams pulse in complementary fashion. One of the beams is modulated in response to a detection signal to null the time variance in the sum and produce a new constant sum. The modulation thereby prevents further generation of the detection signal a time after motion within the sensing region has ceased.

The foregoing and other objects, features, and advantages of the invention will become more apparent from the following detailed description of the preferred embodiments which proceeds with reference to the accompanying drawings.

DETAILED DESCRIPTION

Overview

Figure 1:
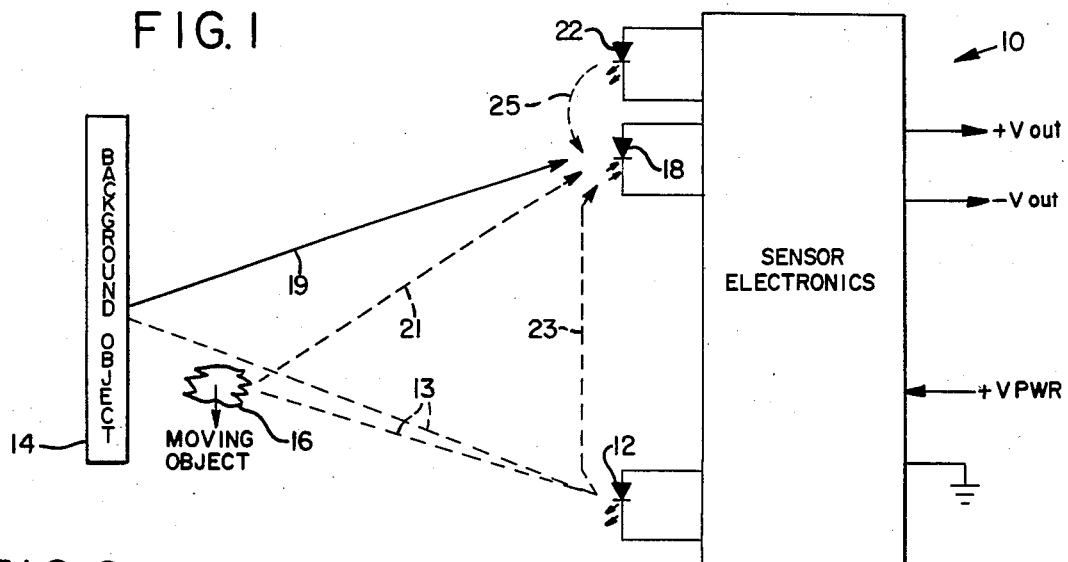
FIG. 1 is a block diagram showing an optical motion sensor according to the invention in an operative setting.

FIG. 1 shows an optical motion sensor 10 according to the invention in an operative setting. The sensor 10 includes a first emitting means such as an infrared light emitting diode (LED) 12. LED 12 emits rays of a first beam of energy represented by dashed lines 13 into a sensing region of space. The beam reflects off objects in the region, such as a stationary background object 14 and a moving object 16. The light energy reflected from these objects is sensed by a photodetector sensitive to the energy emitted by the emitting means such as a PIN diode 18. The diode 18 generates in response a signal current proportional to the intensity of the light received. As indicated in FIG. 1, the infrared rays from LED 12 generate several signal currents within photodiode 18. The quiescent signal current $I_q$ is proportional to the reflected energy received from stationary background objects when no motion is occurring within the region. This energy is represented by solid line 19. The target signal current $I_t$ is proportional to the change in the reflected energy received caused by moving object 16. This energy is represented by dashed line 21. The leakage signal current $I_l$ is proportional to the beam energy which inevitably is directly incident on the photodiode 18. This energy is represented by dashed line 23.

The first beam is not present continuously but is pulsed on and off. Complementary to the first pulsed beam emitted by LED 12 is a second pulsed beam emitted by means such as an infrared LED 22. Although pulsing is utilized in this embodiment of the sensor 10, other well recognized techniques may also be used to generate complementary beams. For example, the two beams could be sinusoids that are 180° out of phase. By their complementary nature whatever the technique, the second beam is present at the photodiode 18 when the first beam is absent and the first beam is present at the photodiode when the second beam is absent. The energy from the second beam is provided to balance the infrared energy received by photodiode 18 from the LED 12. The second beam is of less intensity and present for a longer duration than the first beam but is transmitted directly to the photodiode 18 as indicated by dashed line 25 to produce a proportional signal current $I_b$.

As will be described in detail hereafter, the intensity of the second beam is modulated in response to the intensity of the first beam sensed by photodiode 18 to produce a substantially constant sensing signal as the two beams are pulsed on and off. This signal remains a constant or DC signal so long as an object 16 does not move within the sensing region to change the amount of reflected energy at the photodiode 18. The photodiode therefore sees a substantially DC energy signal when no motion is present. Filter means within the sensor 10 prevent the DC signal from generating a detection signal indicative of motion. If an object moves within the sensing region, the energy of the first pulsed beam reflected to the photodiode changes, thereby introducing a time varying or AC signal portion into the sensing signal and producing the signal current $I_t$. This change in current causes means within the sensor 10 to generate a detection signal indicative of motion. Modulating means within the sensor 10 responsive to a detection signal then modulates the intensity of the second beam to null the time varying portion and establish a new constant sensing signal.

The optical motion sensor 10 may also be configured to be a presence detector by changing the rate at which the intensity of the second beam is modulated. The detection signal will be generated once an object enters the region until the object is removed or enough time elapses to produce a new sensing constant signal.

The sensor 10 as shown in FIG. 1 is configured in an autoreflective mode, with the first beam reflecting off objects within the sensing region. The system, however, can be configured in other modes without departing from the principles of the invention. In a retroreflective mode, a reflective surface such as a mirror is spaced apart from the LED 12 across a boundary. The angle of the first beam is narrowed and the beam is directed toward the mirror. The mirror increases the intensity of the energy reflected to the photodiode 18 and thereby considerably extends the range of the sensor 10. The range may be extended further in a transmissive mode, whereby the photodiode 18 and LED 22 are spaced apart from the LED 12. The first beam is then directed across the boundary to the photodiode but does not have to travel back the distance to its origin. The transmissive mode thereby effectively increases the range of the sensor 10.

Block Diagram

Figure 2:
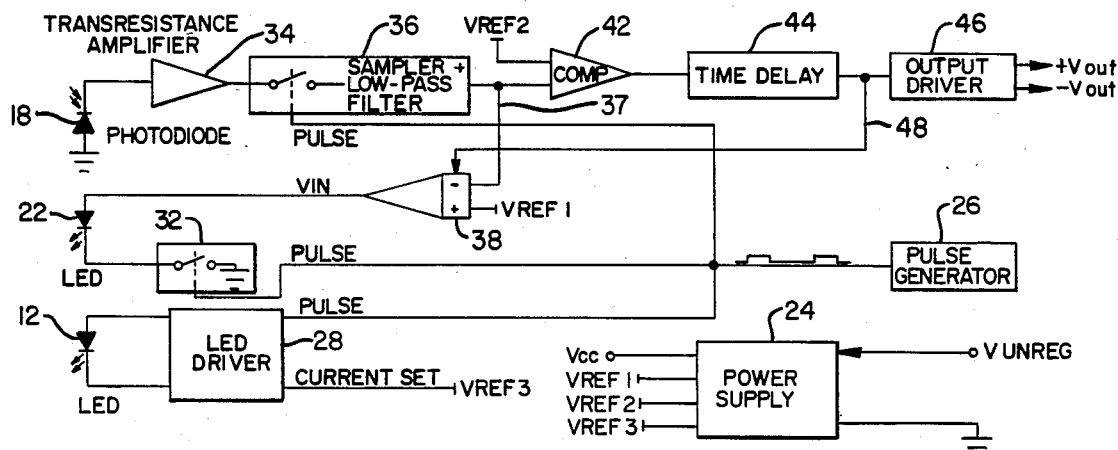
FIG. 2 is a block diagram of the optical motion sensor of FIG. 1.

FIG. 2 shows a block diagram of the elements comprising sensor 10. A power supply 24 receives an unregulated DC voltage $V_{unreg}$ and provides a supply voltage $V_{cc}$ for the sensor and a number of reference voltages. The power supply 12 is of conventional design, an example of which will be described with reference to FIG. 3.

The LEDs 12 and 22 are pulsed in complementary fashion by a pulse generator 26 that provides a rectangular pulse waveform. The duty cycle illustrated is 1%, with the LED 12 pulsed during the presence of the pulse and the LED 22 pulsed during the absence of the pulse. It should be understood that the duty cycle may be varied within a range as will be described. The pulse portion of the waveform enables an LED driver 28 to drive LED 12. The LED driver 28 regulates the intensity of the first pulsed infrared beam emitted by LED 12 by reference to $V_{ref3}$, a reference voltage that sets the current flowing through the LED. The nonpulse portion of the waveform closes a switch 32 that enables the LED 22 to generate the second pulsed beam.

The photodiode 18 that senses and sums the energies of the complementary beams generates a proportional signal current $I_{net}$ as the beams pulse on and off:

$$I_{net} = I_q + I_t + I_1 + I_b$$

The current $I_{net}$ is routed to detection means such as a transresistance amplifier 34 for producing a high gain signal voltage proportional to the sensing signal current. The amplifier 34 includes filtering means such as blocking capacitors to filter out the DC signal portion and low frequency infrared signal fluctuations within the sensing signal. The cutoff frequency for this highpass filter is around 20 kHz. For example, changes in ambient infrared energy produced by switching on and off incandescent or fluorescent lights are filtered out before generation of the signal voltage at the output of amplifier 34. A relatively higher frequency AC signal portion caused by reflections of the first beam from moving objects within the sensing region, however, will pass through the AC coupled amplifier 34.

The output of amplifier 34 is sampled by a sampler 36 that includes a low-pass filter. The cutoff frequency for this low-pass filter is around 20 Hz. The sampler 36 samples the amplifier output during the presence of the first pulsed beam. This sampling converts the amplitude of a synchronous time varying or AC signal passed through the amplifier 34 to a proportional constant or DC detection signal. This proportional detection signal is routed via a feedback path 37 to an integrator 38. Integrator 38 modulates the second pulsed beam at a predetermined rate to provide a voltage $V_{in}$ proportional to the integral of the detection signal voltage. The voltage $V_{in}$ controls the current through LED 22 and thereby the energy of the second pulsed beam that is received by the photodiode 18. This feedback loop adjusts the output signal voltage of sampler 36 by changing $V_{in}$ to produce a constant sensing signal at the photodiode 18. The rate of change of $V_{in}$ is determined by the time constant of the integrator 38. $V_{in}$ continues to change after a disturbance in the sensing region until the energy received at photodiode 18 is again constant and the time varying portion of the sensing signal is nulled. This nulling removes the proportional detection signal and the sampler output voltage becomes equal to the reference voltage $V_{ref1}$ under quiescent conditions. The net change therefore is in the level of $V_{in}$.

The output voltage of sampler 36 is also compared against another reference voltage $V_{ref2}$ at comparator 42 to determine if movement has taken place. In a quiescent state, the sampler output voltage is equal to $V_{ref1}$ which is in a predetermined relation to $V_{ref2}$. If a relatively small change in reflected energy is sensed at photodiode 18, a proportional detection signal may be generated at the output of sampler 36, but the value of that signal may not be sufficient to trip comparator 42. However, integrator 38 will adjust $V_{in}$ to change the intensity of the second pulsed beam in response to generation of a detection signal. Within the time set by integrator 38, the change in reflected energy is compensated for and the sampler output voltage returns to the level of $V_{ref1}$, nulling the time varying signal and removing the detection signal. If the change in reflected energy is such to produce a sufficiently strong detection signal at the output of amplifier 34, the signal will trip comparator 42 and be transmitted through the comparator to a time delay circuit 44. Time delay 44 is a delay circuit that delays the detection signal momentarily to filter out transient signals that may be caused by noise. A detection signal that survives the time delay circuit 44 is routed to output driver circuitry 46 for performing the desired sensor function such as sounding an alarm or opening a door. The detection signal at the output of time delay circuit 44 is also routed via feedback path 48 to the integrator 38 to change the integrator time constant. Alternatively, the feedback path could be from the output of comparator 42 to integrator 38. This shorter time constant accelerates the changing of $V_{in}$ once the time delay circuit 44 confirms a detection signal. The energy in the second pulsed beam is thereby more rapidly modulated until the output voltage of sampler 36 is again at its quiescent level of $V_{ref1}$.

Schematic Diagrams

Figure 4:
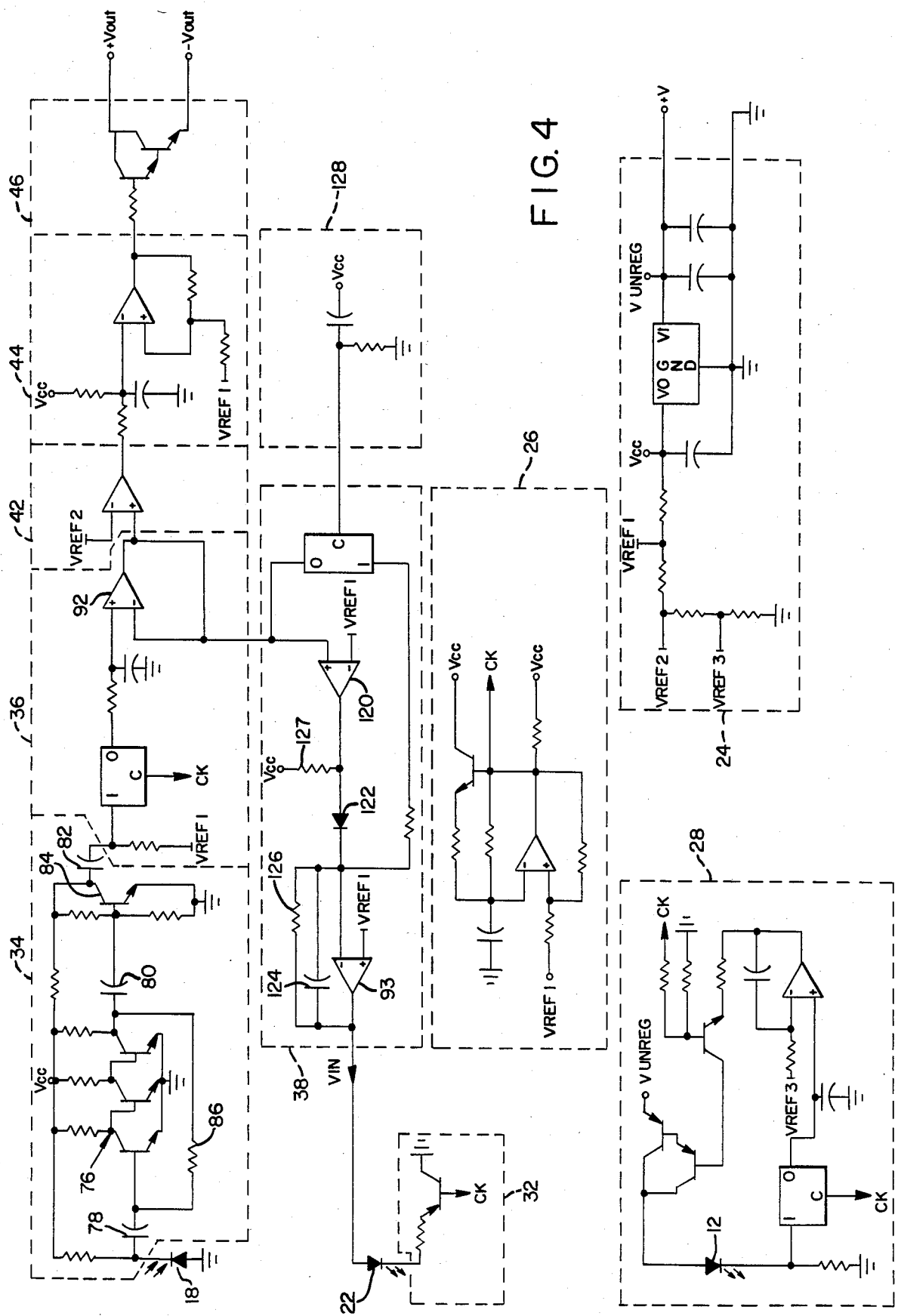
FIG. 4 is a schematic diagram showing a second embodiment of the optical motion sensor configured as a presence sensor.
Figure 3:
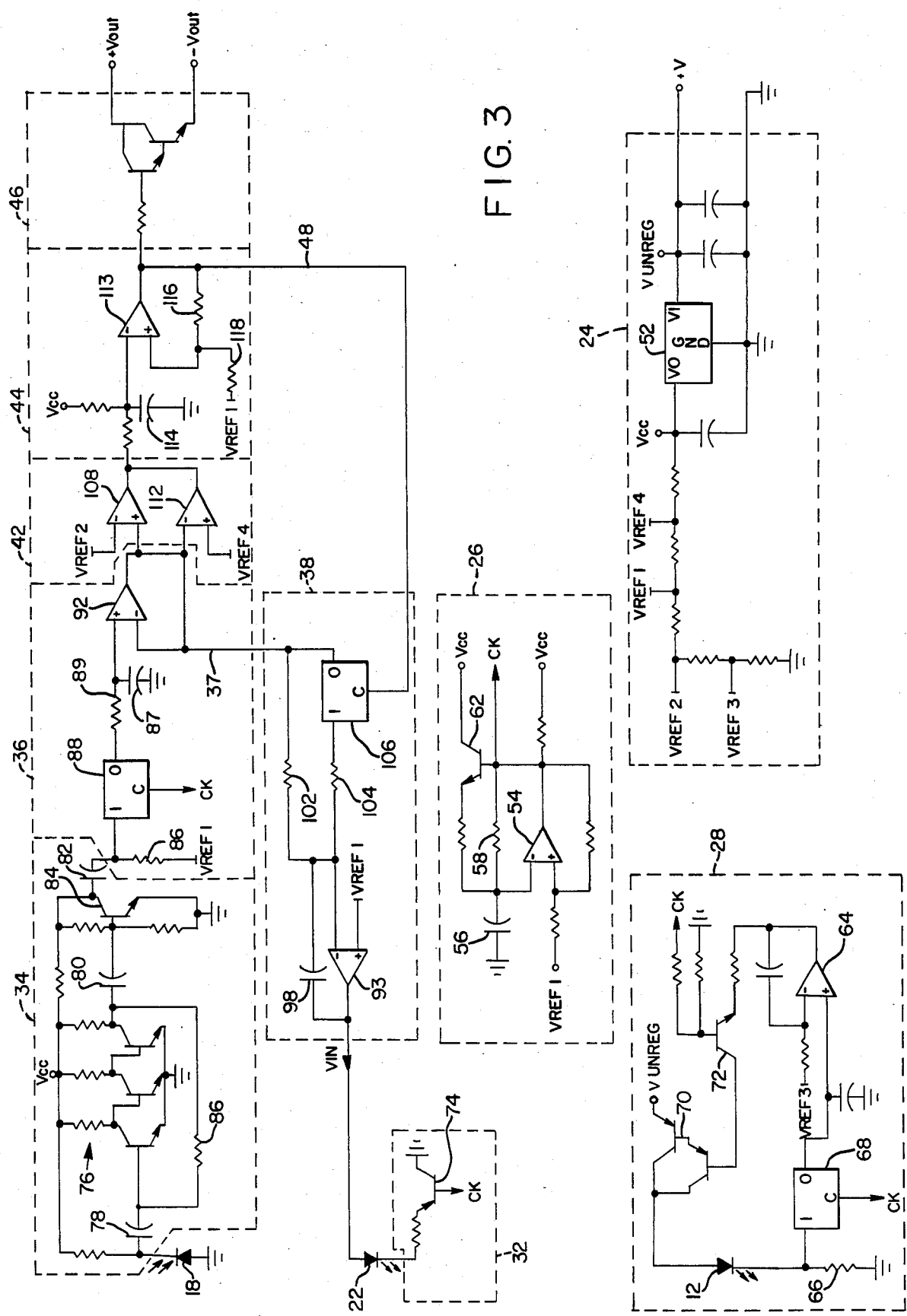
FIG. 3 is a schematic diagram showing one embodiment of the optical motion sensor.

FIGS. 3 and 4 are schematic diagrams of the sensor 10 for sensing motion and presence, respectively. It should be understood that the schematics shown herein are merely enabling illustrations of circuits that can be used to accomplish the functions of the block elements in FIG. 2 and are not meant as limitations on the scope of the invention.

Referring to FIG. 3, each of the blocks referred to is outlined thereon. The power supply 24 includes a conventional voltage regulator 52 that receives the unregulated DC voltage $V_{unreg}$ on its input and generates a supply voltage $V_{cc}$ as well as four reference voltages at its output. The amplitudes of the reference voltages decrease in the order shown across the series of resistors, with $V_{ref4}$ at the highest voltage and $V_{ref3}$ at the lowest voltage.

The pulse generator 26 receives $V_{cc}$ and $V_{ref1}$ from the power supply 24 and in turn generates a rectangular pulse waveform labeled as the signal CK in the figure. The generator 26 includes a comparator 54 to whose noninverting terminal $V_{ref1}$ voltage is applied. Connected in feedback to the inverting terminal is the output of the comparator 54, which also charges a capacitor 56 via the supply voltage $V_{cc}$. Connected in parallel between the comparator output and capacitor 56 are resistor 58 and a transistor 62. Transistor 62 provides a fast charging path for charging capacitor 56 while the output of the comparator is at $V_{cc}$. The resistor 58 provides a slower discharge path for the capacitor while the comparator output is at ground. This fast charging and slow discharging produces a pulse waveform with a 1% duty cycle. In this embodiment, element values are such that the pulse duration during charging of capacitor 56 is 5 microseconds and the total period is 0.5 milliseconds. The signal CK therefore is produced by the toggling of comparator 54 as capacitor 56 charges and discharges according to two time constants.

The signal CK is routed to the LED driver 28 for producing the pulsing of LED 12. Driver 28 also receives the unregulated voltage $V_{unreg}$ and the reference voltage $V_{ref3}$. The current through LED 12 is regulated by a feedback loop that includes an integrator 64. The integrator senses the current via an analog switch 68 that is pulsed by the signal CK to sample the voltage across the resistor 66. The integrator 64 adjusts the voltage across the resistor 66 to the level of $V_{ref3}$ to set the LED current to an exact amount. The integrator 64 acts by controlling the amount of base current in a PNP Darlington pair 70 that receives $V_{unreg}$. The voltage at the output of the integrator 64 controls the emitter current of a transistor 72. The collector current of transistor 72 in turn controls the base current of the Darlington pair, which sources the current to LED 12. The signal CK simultaneously renders transistor 72 conductive and closes switch 68 to enable $V_{unreg}$ to drive the LED 12 through the Darlington pair 70 as the integrator 64 samples the voltage across current limiting resistor 66. In this manner, the current through the LED 12 is set each pulse so that the LED emits a constant light intensity.

The LED 22 that emits the second pulsed beam is enabled on the complementary nonpulse portion of the pulse waveform by the switch 32, which in this embodiment comprises PNP transistor 74 in FIG. 3. The signal CK is applied to the base of transistor 74 to block current through the LED during the presence of the pulse portion of the waveform. During the nonpulse portion, transistor 74 is conductive to enable the LED 22 to emit its beam.

The current through the LED 22 and therefore the intensity of the second pulsed beam is modulated in response to the output of amplifier 34. The amplifier 34 is coupled to the photodiode 18 and includes a series of NPN transistors 76 for providing high gain to the photodiode signal current and for transforming the current to a signal voltage. The amplifier 34 is AC coupled to the photodiode by capacitors 78, 80, and 82. These capacitors are chosen for blocking the DC or constant signal portion of the signal current produced at the photodiode 18 and for filtering out low frequency signal fluctuation produced by changes in the ambient light. The amplifier also includes a fourth transistor 84 for providing additional gain to the output signal voltage. The DC operating points of the transistors 76 are set via a feedback path that includes the resistor 86. The output signal voltage of the amplifier therefore changes only with the change in the reflected energy sensed by the photodiode 18 and converted to a time varying signal current. Because of the operation of photodiode 18, an increase in photodiode current brought about by an increase in reflected energy causes a decrease in the output voltage of transistor 84. A decrease in photodiode current causes a corresponding voltage increase.

The sampler 36 includes a capacitor 87 and an analog switch 88 that has at its input $V_{ref1}$ across a biasing resistor 86. If the current in the photodiode 18 changes, an output signal voltage appears across biasing resistor 86 and the voltage sampled by switch 88 changes from $V_{ref1}$. This new output signal voltage is clocked by the signal CK through switch 88 which converts the amplitude of the voltage to a proportional DC detection signal. The detection signal is routed through the low-pass filter comprising a resistor 89 and capacitor 87 for filtering out unwanted high frequency signals and to a voltage follower 92 for buffering.

The output voltage of follower 92 will contain a detection signal if an AC signal has occurred in response to a change in energy received from LED 12 by the photodiode 18. To compensate for the change, the output is routed via path 37 to the inverting input of an operational amplifier 93 within integrator 38 for comparison against $V_{ref1}$. If the voltage at the output of follower 92 differs from $V_{ref1}$, then $V_{in}$ at the output of amplifier 93 changes to modulate the current through LED 22. This negative feedback loop will continue to adjust $V_{in}$ until the sensing signal produced at photodiode 18 in response to the received energy is again constant and no net AC signal appears at the output of the amplifier 34.

Integrator 38 includes in addition to operational amplifier 93 a capacitor 98 connected in series with parallel resistors 102 and 104 to provide two time constants over which to integrate the follower 92 output voltage. With the analog switch 106 open, the time constant is set by the larger resistor 102 which slows the rate at which $V_{in}$ changes to adjust the LED 22 to its new level of intensity. With switch 106 closed, the time constant is set by resistor 104 in parallel with resistor 102, which increases the rate at which $V_{in}$ changes. The second time constant is chosen once the time delay circuit 44 has confirmed the genuineness of the detection signal.

The output of follower 92 is routed as well to comparator 42 which comprises in this embodiment a window comparator of separate comparators 108 and 112. These two comparators compare the output voltage of amplifier 92 against limiting reference voltages $V_{ref2}$ and $V_{ref4}$. If the output voltage contains a detection signal and becomes greater than reference voltage $V_{ref4}$ or less than reference voltage $V_{ref2}$, the detection signal is assumed to indicate movement toward or away from the LED 12 within the sensing region. The detection signal drops below $V_{ref2}$ if object 16 moves toward the LED 12 and increases to exceed $V_{ref4}$ if object 16 moves away from the LED.

The outputs of comparators 108 and 112 are wire-ANDed and routed to the time delay 44 which comprises an inverting hysteresis comparator 113 that delays by way of capacitor 114 the transition of a detection signal for a predetermined time to filter out transient-generated detection signals. The hysteresis points are established by resistors 116 and 118 and $V_{ref1}$. If the detection signal generated by the comparators 108 and 112 is of sufficient duration to drop the voltage at the inverting input of comparator 113 below the lower hysteresis level, then the detection signal is confirmed to be genuine. The comparator 113 then generates sufficient voltage to drive the base of an NPN Darlington pair that comprises the output driver 46. As briefly discussed, the output voltage of the time delay 44 is also routed back to the analog switch 106 via a path 48 to switch the integrator 38 to the faster time constant.

FIG. 4 shows a second embodiment of the sensor 10 configured as a presence sensor. The differences between the two are focused on the design of the integrator 38. For a presence sensor the integrator utilizes a much longer time constant when the amount of energy received by the photodiode is increasing, indicating movement toward the LED 12, than when the amount of energy received by the photodiode is decreasing, indicating movement away from LED 12.

Referring to sampler 36, an object moving into the sensing region causes the output voltage of the voltage follower 92 to drop proportionally as a detection signal. This output is routed to the noninverting input of a comparator 120 for comparison against $V_{ref1}$. With a sufficient decrease in the output voltage from follower 92, the comparator 120 will change its state and back bias a diode 122. The cutoff of current through the diode 122 causes a capacitor 124 connected across amplifier 93 to discharge slowly through a high valued resistor 126 such as 100 megohms and slowly raise the voltage $V_{in}$ applied across LED 22. In turn, the LED 22 increases the intensity of its beam until photodiode 18 again is producing a constant sensing signal as it sums the energies of the two complementary beams. If the output voltage on the follower 92 increases because an object is moving away from the LED 12, the comparator 120 changes state to forward bias the diode 122 with the supply voltage $V_{cc}$ through a much lower valued resistor 127 such as 100 kilohms. The output of the amplifier 93 decreases, decreasing $V_{in}$ and lowering the intensity of the beam being emitted by LED 22. The integrator 38 therefore compensates for changes in reflected energy much more quickly when an object moves away from the sensing region than when an object moves into the sensing region. The purpose of this arrangement is to extend quickly the sensing range of the photodiode 18 once an object has moved further from the LED 12.

In contrast to the motion sensor FIG. 3, the presence sensor FIG. 4 has a single comparator 108 within the comparator element 42. Only one comparator is utilized because only movement toward the LED 12 is of concern. A power-on reset 128 is also provided to stabilize quickly the sensor 10 on power-up.

The following is a list of typical components that may be used in constructing the embodiments just described:

| Photodiode 18 | SFH205 | Siemens |
|---|---|---|
| LED 12 | SFH484 | Siemens |
| LED 22 | IRL81A | Siemens |
| NPN transistors | 2N5089 | Motorola |
| PNP transistors | MPS2907A | Motorola |
| Darlington PNP | MPSU45 | Motorola |
| Operational amplifiers | LM324 | National Semi. |
| Comparators | LM339 | National Semi. |
| Analog switches | CD4066 | RCA |
| Voltage regulator | 7805 | National Semi. |

Operation

FIGS. 5A through 5G illustrate the generation of signal currents proportional to the summing of energies at the photodiode 18 as the sensor 10 adjusts to objects moving within its sensing region. In the quiescent state shown in FIGS. 5A and 5B, reflected energy from the first pulsed beam and energy that is leaked directly to the photodiode produce currents $I_q$ and $I_1$. The second LED 22 is modulated by integrator 38 to generate a complementary beam that produces the same photodiode current, labeled as $I_b$. The net current $I_{net}$ (the sum of $I_q + I_1 + I_b$) shown in FIG. 5C therefore is constant as a DC offset which is ignored by the amplifier 34 and no detection signal is produced.

Figure 5A:
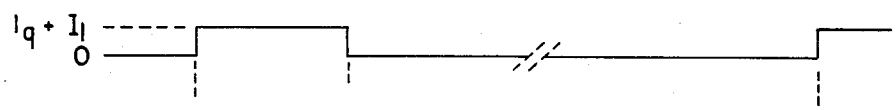
FIGS. 5A through 5G are timing diagrams illustrating the operation of the optical motion sensor.
Figure 5B:
Figure 5C:
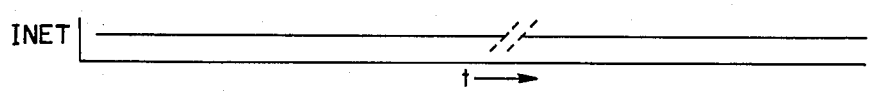
Figure 5D:
Figure 5E:
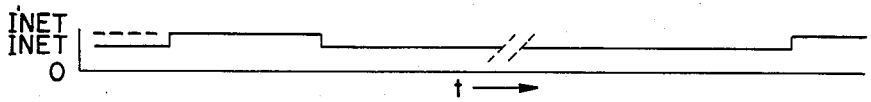
Figure 5F:

When a moving object 16 enters the path of LED 12, the energy reflected to the photodiode 18 increases and produces a current $I_t$ shown in FIG. 5D. This signal current is summed with the currents $I_q$ and $I_1$ during the presence of the first pulse to produce $I'_{net}$ in FIG. 5E, a net time varying or AC signal over the period of the pulse waveform. A detection signal is then generated by amplifier 34. The detection signal is sampled by sampler 36 and if the signal survives the low-pass filter within the sampler, the signal is routed to integrator 38. The integrator 38 responds to this detection signal by modulating the second pulsed beam to produce an increase in $I_b$, the increased current shown as $I'_b$ in FIG. 5F. Assume now that object 16 has stopped moving and the amount of reflected energy is no longer changing over the time set by the slower time constant of integrator 38, the LED 22 is adjusted until the intensity of its beam is such that:

$$I'_{net} = I'_b + I_q + I_1 + I_t$$

Figure 5G:
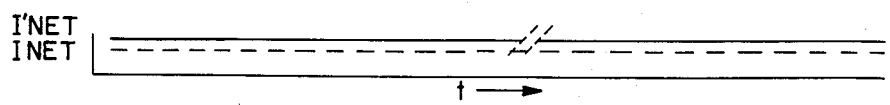

As shown in FIG. 5G, a new constant sensing signal $I'_{net}$ results. The AC portion of the signal $I_t$ is nulled as $I'_b$ is added to $I_b$. The detection signal thereby is nulled.

In use of the sensor 10, a number of different sensors may be provided to cover a larger region. The sensing regions of each sensor may overlap without interfering with each other's signals because of the low duty cycle of the first pulsed beam. With the 1% duty cycle, there is but a remote chance of the first pulsed beams being present simultaneously. The length of the duty cycle may be varied, but it must be sufficient in duration for the sampler 36 to sample the output of the amplifier 34 accurately.

Having illustrated and described the principles of the invention in preferred embodiments, it should be apparent to those skilled in the art that the invention can be modified in arrangement and detail without departing from such principles. For example, many of the analog elements in these embodiments may be replaced by digital elements. Other types of amplifiers with high gain and filters can be substituted for amplifier 34. The integrator 38 could be replaced with a digital to analog converter. Additionally, the integrator may be designed such that after the sensor circuit settles down after power-up, the feedback loop is broken to hold the state of the integrator constant as a presence detector. Moreover, a manual feedback such as a potentiometer could be used to set the feedback in place of the automatic adjustment described. I claim all modifications such as these coming within the spirit and scope of the following claims.

I claim:

1. An apparatus for sensing motion within a sensing region, comprising:
   a first emitting means for emitting a first beam of energy;
   a second emitting means for emitting a second beam of energy;
   sensing means for receiving and summing the energies of the first and second beams to produce a corresponding sensing signal, the intensities of the first and second beams chosen to produce a sensing signal whose amplitude is constant when no motion is being sensed and whose amplitude includes a time varying portion when motion is being sensed;
   filter means coupled to the sensing means for blocking the constant portion of the sensing signal and passing the time varying portion;
   detection means for converting the time varying portion to a detection signal indicative of motion; and
   modulating means responsive to the detection signal for modulating one of the beams to null the time varying portion,
   the detection signal continuing until the modulating means causes the sensing means to produce a sensing signal with constant amplitude.

2. An apparatus for sensing motion within a sensing region, comprising:
   a first emitting means for emitting a first beam of energy;
   a second emitting means for emitting a second beam of energy complementary to the first beam;

sensing means for receiving and summing the energies of the first and second beams to produce a corresponding sensing signal having a constant signal portion and while motion is being sensed a time varying signal portion;

filter means coupled to the sensing means for blocking the constant signal portion of the sum and passing the time varying signal portion;

detection means for converting the time varying signal portion to a detection signal indicative of motion; and modulating means responsive to the detection signal for modulating one of the beams to null the time varying signal portion of the sensing signal, the detection signal continuing until the modulating means causes the sensing means to produce a constant sensing signal.

3. The apparatus of claim 2 including means for pulsing the first and second beams to complement each other.

4. The apparatus of claim 2 including comparator means for comparing the detection signal against a reference signal as the value of the detection signal changes in response to the modulation of the beam, the comparator means confirming the detection signal if the value of the detection signal crosses the value of the reference signal.

5. The apparatus of claim 2 in which the modulating means is adapted to modulate the beam at a rate proportional to the value of the detection signal.

6. The apparatus of claim 5 in which the modulating means comprises an integrator and a switch, the integrator having faster and slower time constants to change the rate at which the beam is modulated, the switch opened to utilize the slower time constant so long as the value of the detection signal is less than the reference signal value and the switched closed to utilize the faster time constant if the value of the detection signal crosses the reference signal value.

7. The apparatus of claim 2 in which the detection means comprises a sampler for sampling output of the filter means synchronous with the emission of the first pulsed beam.

8. The apparatus of claim 3 in which the duty cycle of the first beam is about 1%.

9. The apparatus of claim 3 in which the pulse of the first beam is of shorter duration than the complementary pulse of the second beam, the first pulsed beam projected to reflect off objects within a sensing region before sensing by the sensing means and the second pulsed beam directly transmitted to the sensing means.

10. The apparatus of claim 9 in which the intensity of the second pulsed beam is modulated and the intensity of the first pulsed beam is maintained constant.

11. The apparatus of claim 2 in which the first and second emitting means comprise light emitting diodes and the sensing means comprises a photodiode.

12. The apparatus of claim 2 in which the sensing means comprises a photodiode that produces a sensing signal current and the filter means includes an amplifier for converting the time varying signal current to a proportional signal voltage.

13. The apparatus of claim 2 including delay means for delaying further transmission of the detection signal for a predetermined time to filter out transient generated detection signals.

14. An optical motion sensor, comprising:
a first light emitting diode for emitting a first pulsed beam;
a second light emitting diode for emitting a second pulsed beam;
a pulse generator for pulsing the first and second light emitting diodes to produce complementary pulsed beams of energy;
a photodetector for receiving and summing the energies of the complementary pulsed beams and producing a sensing signal proportional to the sum of the beam energies, the sensing signal having a constant signal portion and a time varying signal portion;
an amplifier AC coupled to the photodiode for blocking the constant signal portion of the signal current and passing the time varying signal portion;
sampling means for sampling the time varying signal portion synchronous with the first pulsed beam and converting the amplitude of the signal to a proportional DC detection signal; and
modulating means coupled to the sampling means and responsive to the detection signal for modulating the second pulsed beam at a rate proportional to the value of the detection signal to produce a constant sensing signal in the photodetector by nulling the time varying signal portion thereof, the detection signal continuing until the modulating means causes the photodetector to produce a constant sensing signal.

15. A method for sensing motion within a region, comprising:
generating a first beam of energy to reflect off objects within the region;
generating a second beam complementary to the first pulsed beam;
sensing the sum of the beam energies at a detection point;
generating a detection signal proportional to the change in the energy sum if the sum varies over time;
modulating in response to a detection signal the intensity of one of the pulsed beams to null the time variance in the sum, the modulating thereby preventing further generation of the detection signal after motion within the region has ceased.

16. The method of claim 15 in which the first and second beams are pulsed to complement each other.

17. The method of claim 15 in which the first beam is transmitted to reflect off objects within the region before being sensed and the second pulsed beam is sensed directly.

18. The method of claim 17 in which the second beam is modulated.

* * * * *